United States Patent

[11] 3,602,121

| [72] | Inventor | Paul J. Ernisse<br>Rochester, N.Y. |
|---|---|---|
| [21] | Appl. No. | 802,865 |
| [22] | Filed | Feb. 27, 1969 |
| [45] | Patented | Aug. 31, 1971 |
| [73] | Assignee | Eastman Kodak Company<br>Rochester, N.Y. |

[54] CAMERA LATCH WITH WINDING CLUTCH
3 Claims, 7 Drawing Figs.

[52] U.S. Cl. .................................................. 95/31 R,
95/11, 292/334, 292/DIG. 38, 292/DIG. 48,
292/DIG. 72
[51] Int. Cl. ....................................................... G03b 19/04,
E05b 63/20
[50] Field of Search ........................................ 95/11, 31;
292/DIG. 38, DIG. 48, DIG. 72, 334

[56] References Cited
UNITED STATES PATENTS

| Re.26,181 | 4/1967 | Harvey et al. .................. | 95/31 |
|---|---|---|---|
| 3,358,574 | 12/1967 | Liverano ....................... | 95/11 |
| 3,459,110 | 8/1969 | Papke et al. ................... | 95/31 |
| 3,511,154 | 4/1970 | Simon .......................... | 95/31 |

*Primary Examiner*—Samuel S. Matthews
*Assistant Examiner*—M. L. Gellner
*Attorneys*—Robert W. Hampton and J. Addison Mathews ABSTRACT: An improved one-piece camera latch which may be formed from plastic or other moldable material and which includes a latching lug for releasably latching the cover member in a closed position, a resilient abutment member for urging the cover member to an open position when the latching lug is in a releasing position, and an end portion for moving a camera film-winding clutch member between an extended position when the latching lug is in a latching position and a retracted position when the latching lug is in a releasing position.

PAUL J. ERNISSE
INVENTOR.

BY
ATTORNEYS

PAUL J. ERNISSE
INVENTOR.

ATTORNEYS 3,602,121

CAMERA LATCH WITH WINDING CLUTCH

BACKGROUND OF THE INVENTION

1. FIELD OF THE INVENTION

The present invention relates to a latching device for a cover member on a photographic camera, and more particularly to such a latching device which includes means for urging the cover member to an open position upon unlatching thereof.

2. Brief Description of the Prior Art

It is well known in the photographic art to provide cameras with a latching device which maintains a cover member of the camera in a closed position to enclose film in an otherwise open-sided chamber of the camera. It is also known in the art to provide such latching devices with means for resiliently urging the cover member to a partially open position upon unlatching thereof such that the cover member may be more easily grasped and further opened by the camera operator when he desires to insert film into or remove film from the chamber. Moreover, certain previous such latching devices have included an abutment or yoke means on one end thereof for moving a driving member of the camera film-winding mechanism to a retracted position when the latching means is in an unlatched position and for permitting movement of the driving member to an extended position when the latching means is in a latched position. such an arrangement permits quick loading of film into or unloading of film from the camera without interference between the film and such driving member. Examples of latching mechanisms of the above types are illustrated and described, for example, in commonly assigned U.S. Pat. No. Re 26,181, entitled "Camera Locking Device," filed in the name of D. C. Harvey et al., reissued on Apr. 4, 1967; and U.S. Pat. No. 3,370,876, entitled "Photographic Camera With Rear Wall Locking Assembly," filed in the name of G. Beutnagel et al., issued Feb. 27, 1967.

While previously known mechanisms or the type set forth above have generally been satisfactory for their intended purposes, they have been somewhat difficult and expensive to manufacture and assemble into a camera. This is due in part to the fact that such prior art mechanisms generally include several parts, all of which must by assembled in operating relationship in the camera. Moreover, many of these parts, and particularly helical or other resilient spring means for urging the cover to a partially open position upon unlatching thereof, have been separately made from metallic material which is somewhat difficult and expensive to form and attach to the other latching elements in an assembly line operation.

SUMMARY OF THE INVENTION

It is an object of the present invention to overcome the forenoted disadvantages of prior art latching devices and to provide such a device of one-piece construction composed entirely of plastic or other moldable material.

In accordance with the present invention a one-piece plastic latching device is provided with integrally molded resilient means for urging the cover member to a partially open position upon unlatching thereof. Moreover, such resilient means is arranged to be tensioned or resiliently bent only during the brief moments when the cover member is being latched or unlatched. At all other times (i.e., when the cover member is either opened or closed) the resilient means is in a relaxed position to thereby substantially eliminate creep or undesirable setting of the plastic resilient means.

In accordance with a preferred embodiment of the present invention, a latching device is provided which comprises a molded plate or supporting member adapted to be mounted in a camera casing for movement between a latching position and a releasing position. The plate member includes latching or locking means for releasably engaging the cover member to thereby releasably latch the cover member in a closed position, and resilient means connected to and formed or molded as an integral part of the plate member for engaging the cover member upon unlatching thereof to resiliently urge the cover member toward a partially open position.

In the preferred embodiment illustrated, the plate member further includes means for engaging a film-driving member of the camera-winding mechanism to urge the driving member to a retracted position when the plate member is in its releasing position and to permit movement of the driving member to an extended position when the latching plate is in its latching position. In connection with such driver-engaging means, the resilient means is provided with means for maintaining the latching plate in its releasing position when the cover door is open and which permits, and in fact aids, movement of the latching member to its latching position when the cover member is closed.

The invention, and its objects and advantages, will become more apparent in the detailed description of the preferred embodiments presented below.

DESCRIPTION OF PREFERRED EMBODIMENT

Figure 1:
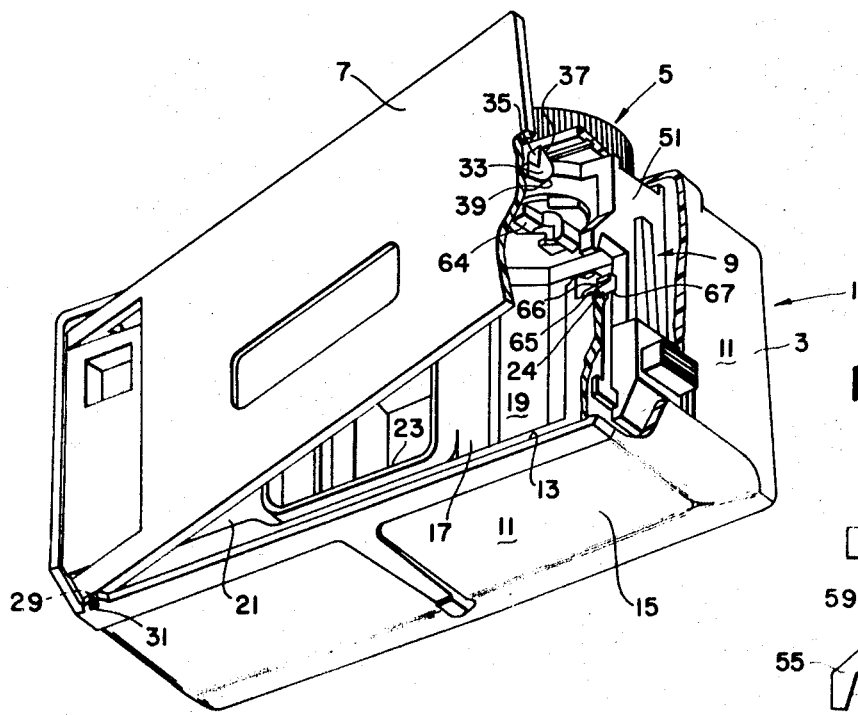
FIG. 1 is a perspective view of a camera incorporating a one-piece molded latching device in accordance with the present invention with a portion of the camera casing broken away to illustrate the latching device in a releasing position thereof.
Figure 2:
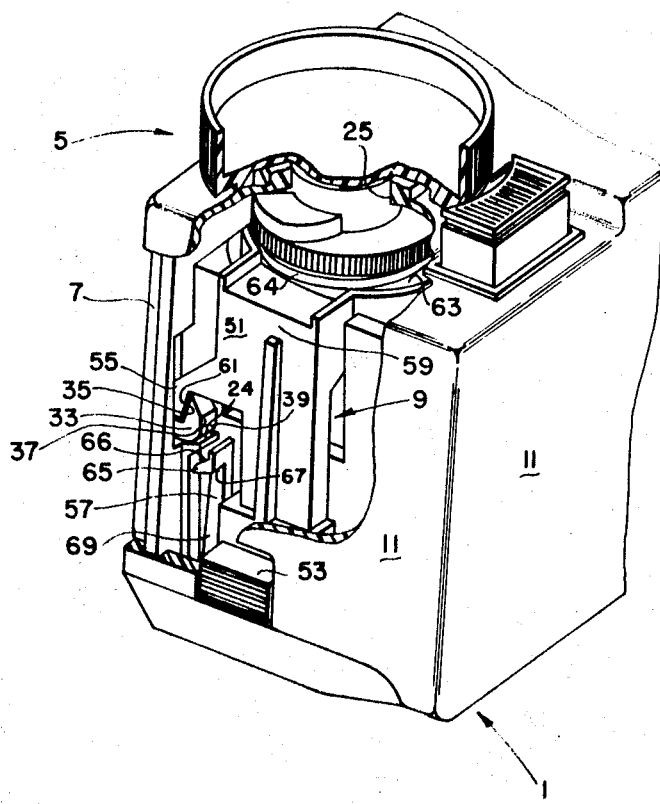
FIG. 2 is a perspective view of a portion of the camera of FIG. 1 with a portion of the camera casing broken away to illustrate the latching device in a latching position thereof.

Referring now to the drawings and particularly to FIGS. 1 and 2, a preferred embodiment of the present invention is disclosed in a camera 1 comprising a casing 3, a film-winding assembly 5, a rear cover member 7, and a latching mechanism 9.

Casing 3 houses the various camera elements in a manner well known in the art and comprises enclosure means such as walls 11 which define camera interior or inner surfaces 13 and camera exterior or outer surfaces 15. Inner surfaces 13 further define film cartridge receiving means 17 including takeup and supply recesses or chambers 19 and 21, and an intermediate or exposure area 23 between the chambers. Chambers 19 and 21 are adapted to respectively receive the takeup and supply portions of a film-cartridge, while exposure area 23 is adapted to receive the central portion of the cartridge and to cooperate with the cartridge gate to permit exposure of film in the cartridge by scene light passing through the camera objective. The above and further details of the cartridge and camera features cooperative therewith, are more fully described in U.S. Pat. No. 3,260,182 issued to H. Nerin on July 12, 1966. The casing is further provided with an abutment or latching surface 24 for a purpose to be described more fully hereinafter.

In order to permit successive winding of film past the camera exposure area 23, the casing 11 is provided on a top surface thereof with means 25 (FIG. 2) defining an opening or bore through the casing and into takeup chamber 21. A film-winding assembly is adapted to be received on the camera casing within this opening 25 and cooperates with a takeup spool in the cartridge to advance film through the camera and past the exposure area 23.

Rear cover member 7 comprises a pivotally mounted door attached to the casing or wall 11 by hinge means comprising pins 29 of the cover member and corresponding recesses 31 in the camera casing 11. The hinge means permits movement of the door from a closed position, wherein the camera interior is completely enclosed, and an open position permitting insertion of a film cartridge into the camera as is well known in the art. Cover member 7 also includes latching or locking means illustrated as a fixed lug member 33 for latching the cover member in a closed position as will be described more fully hereinafter. This lug member includes a latching or locking surface 35 and a releasing means illustrated as camming or abutment surface 37. Moreover, at the lower portion of the camming or abutment surface, a tapered of beveled portion 39 is provided for a purpose to be described more fully hereinafter.

Figure 3:
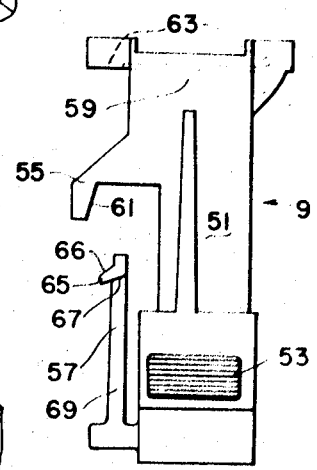
FIG. 3 is a side elevational view of a one-piece molded plastic member comprising a preferred embodiment of the latching device in accordance with the present invention.

Referring now more particularly to the details of the present invention, and to FIGS. 1-3, a preferred embodiment of the invention is disclosed comprising a connecting or support member illustrated as plate 51 which connects and supports a built-up portion or knob 53, a latching means or lug 55, a resilient release member 57, and a forked end portion or yoke 59. Plate 51, and the above-noted elements associated therewith, are adapted to be supported in the casing 3 of camera 1 for longitudinal sliding movement between a lowered or latching position and a raised or releasing position. The connecting or support member may be mounted in the camera in any manner known to those skilled in the art, and further description of such mounting is therefore considered unnecessary.

Knob 53 preferably is formed as an integral part of the plate member and protrudes through casing wall 11 to be grasped by the camera operator for moving the plate 51 between its lowered or latched position and its raised or release position.

Latching lug 55, also preferably formed as an integral part of the plate member, includes a camming or latching surface 61 configured and arranged to engage latching surface 35 of the fixed latching lug 33 on the cover member. The latching surfaces 61 on the plate member and 35 on the cover member engage to cam or lock the cover member in a closed position when the plate member 51 is moved to its lowered or latching position. When the plate member 51 is moved to its raised or release position, on the other hand, the latching surfaces 61 and 35 disengage from each other and thereby permit opening of the camera back cover.

Forked end portion or yoke 59 includes abutment surfaces 63 which straddle and engage the film-driving clutch 64 of film-winding mechanism 5 when the plate member 51 is moved to its raised or release position. Abutment surfaces 63 urge the film-driving clutch to a raised position thereof to permit insertion of film into the camera as briefly mentioned heretofor. When the plate member 51 is moved to its lowered position, abutment surfaces 63 permit movement of the film-driving clutch to a lowered position thereof to drivingly engage the film roll. The manner in which this film-driving clutch is moved between its raised and lowered positions by an abutment member is more fully described in commonly assigned U.S. Pat. No. Re 26,181, filed in the name of D. C. Harvey et al. and reissued on Apr. 4, 1967.

The resilient or release means 57 includes a camming means or first abutment surface 65, a camming or beveled portion 66, a second abutment surface or latching means 67, and a resilient arm or connecting portion 69.

Figure 4:
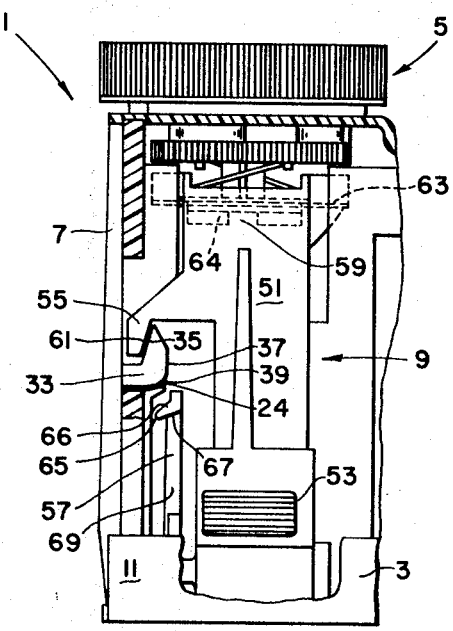
FIG. 4 is a side elevational view of the camera and latching device of FIG. 1 depicting the latching device in a latching position.

Referring now in particular to FIGS. 4 through 7, the operation of the latching device and the operative positions assumed by the various members thereof will be described. In FIG. 4, the latching device is illustrated in the position it will assume when the cover member is latched or locked in its closed position. As illustrated, the latching surfaces 61 on the plate member and 35 on the cover member are engaged to cam the cover member towards the closed position thereof. Moreover, the abutment surfaces 63 on end portion 59 in their lowered position permitting movement of the film driving member to its lowered or engaging position.

Figure 5:
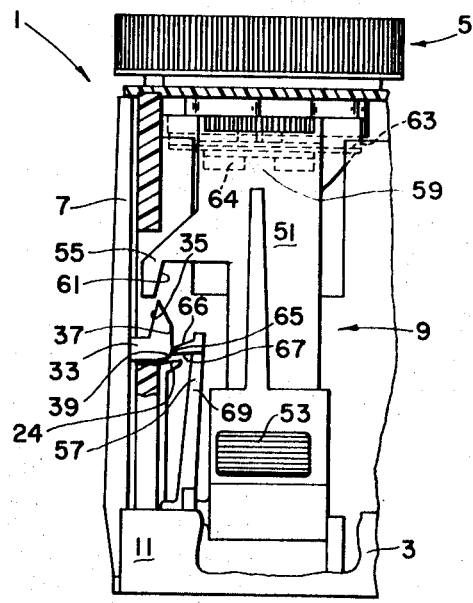
FIG. 5 is a side elevational view corresponding to FIG. 4 and depicting the device in a position it will assume upon release of the cover member.

In FIG. 5, the latching device is illustrated in the position assumed during opening of the camera cover member. In this position of the latching device, the latching surface 35 and 61 are disengaged permitting opening of the cover member. Moreover, the abutment surface 67 of the release member 57 is engaged with abutment surface 37 on fixed latching lug 33 of the cover member to resiliently urge the cover member toward a partially open position where it can be easily grasped by the camera operator. Additionally, abutment means 63 on end portion 59 is engaged with the film-driving member 64 to move the driving member to a raised position thereof permitting insertion or loading of film into the camera.

Figure 6:
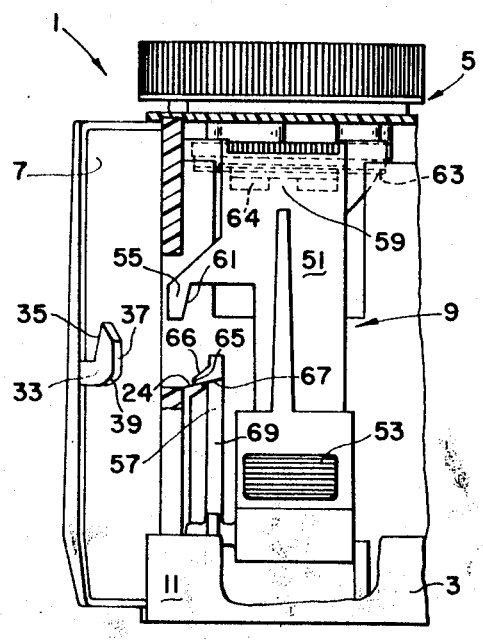
FIG. 6 is a side elevational view corresponding to FIG. 4 and depicting the latching device in a completely released position.

Referring now to FIG. 6, the latching device is shown in the raised or releasing position thereof with the cover member fully opened. This position of the latching device is similar to that of FIG. 5. However, in this FIG. the abutment or latching surface 67 of releasing means 57 is positioned in engagement with a corresponding abutment surface 24 of the camera casing to hold or maintain the latching device and the film-driving member in their raised positions while the cover member is open.

Figure 7:
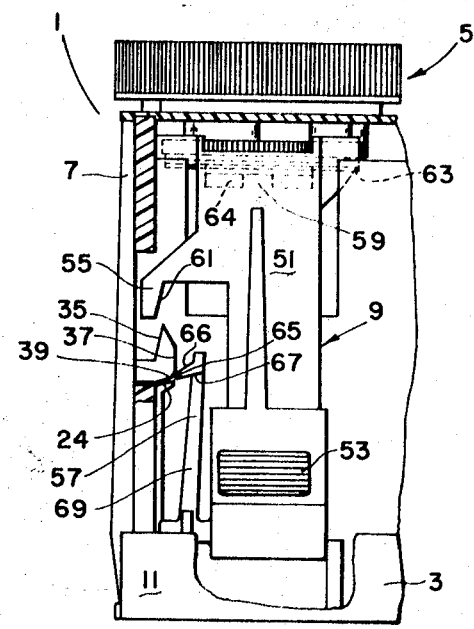
FIG. 7 is a side elevational view corresponding to FIG. 4 and depicting the latching device in a position it will assume upon closing of the cover member.

Referring now to FIG. 7, the latching device is shown in the position it will assume upon closing of the cover member. This position again is similar to that illustrated in FIG. 5. However, this FIG. illustrates the manner in which abutment surface 67 of the releasing means is pushed off of the abutment surface 24 of the camera casing to again permit the latching device to be moved to its lowered or latching position. Moreover, as can be seen from this figure, the beveled surface 66 of the releasing device engages and cooperates with corresponding beveled surface 39 of the fixed latching lug to cammingly urge the latching device towards its lowered position.

As shown in the preferred embodiment, all of the various elements of the latching device 9 are formed or molded from a plastic or other moldable material into a one-piece integral member which includes the plate 51, the knob 53, the lug 55, the end portion 59 and the release means 57. One of the major problems with plastic latching devices of this type, which include resilient members for urging the cover member to a partially open position, has been that the resilient members remain under tension for extended portions of time and therefor tend to set or lose their resiliency. Such problems have previously prevented the use of a one-piece plastic construction as described above. However, it should now be apparent that the present invention eliminates these previous problems and provides a suitable one-piece latching device. More specifically, it can be seen in FIGS. 4-7 that the resilient member is under tension only during short periods of time when the cover member is opened or closed (FIGS. 5 and 7). During all other periods, whether the cover member be in its closed or opened position, and whether the latch device by in its latched or release position, the resilient member is returned to a relaxed position where it will not take a permanent set of lose its resiliency.

The invention has been described in detail with particular reference to a preferred embodiment thereof but it will be understood that variations and modifications can be effected within the spirit and scope of the invention.

I claim:

1. A latch and release member for a camera, said camera including a housing having first and second abutment surfaces and a cover member having closed and open positions, said latch and release member comprising:
   a plate member mounted on the camera for movement between first and second positions;
   a latching lug movable with said plate member for engaging the cover member when the palate member is in its first position to latch the cover member in the closed position and for unlatching the cover member when the plate member is in its second position;

a resiliently flexible arm having first and second opposed ends, said first end being connected to said plate member; and a release lug connected to the second end of said flexible arm, said release lug having:
  a. a cam surface for engaging the first abutment surface of said housing during movement of said plate member from its first to its second position, to first move said release lug in a direction stressing said resilient arm and then release said lug to permit said resilient arm to move said lug to engage the cover member and urge the cover member to an open position, and
  b. a plate member latching surface cooperable with said second abutment surface for latching said plate member in said second position as said release lug moves to urge said cover member to an open position.

2. A latch and release member for a camera, said camera including a housing having first and second abutment surfaces, a cover member having closed and open positions, and a winding clutch having retracted and extended positions, said latch and release member comprising:

a plate member mounted on the camera for movement between first and second positions;

a latching lug movable with said plate member for engaging the cover member when the plate member is in its first position to latch the cover member in a closed position and for unlatching the cover member when the plate member is in its second position;

a resiliently flexible arm having first and second opposed ends, the first end being connected to said plate member;

a release lug supported by the second end of said flexible arm, said release lug having
  means defining a plate member latching surface, and
  a cam surface for engaging the first abutment surface during movement to said plate member from its first move said release lug in a direction stressing said flexible arm and then release said release lug to permit said flexible arm to move said lug into engagement with the cover member to urge the cover member to an open position and to move the plate-member-latching surface into latching engagement with said second abutment surface to latch said plate member in its second position; and means movable with said plate member for holding the winding clutch in its retracted position when the plate member is in its second position and for permitting the clutch member to move to its extended position when the plate member is in its first position.

3. The latch and release member according to claim 2 wherein said second abutment surface is positioned to permit release of said release lug in response to closing of said cover member and said cam surface and said first abutment surface are positioned to cooperated to move said plate member to its first position under urging of said flexible arm when said release lug is so released.